Patented Mar. 30, 1926.

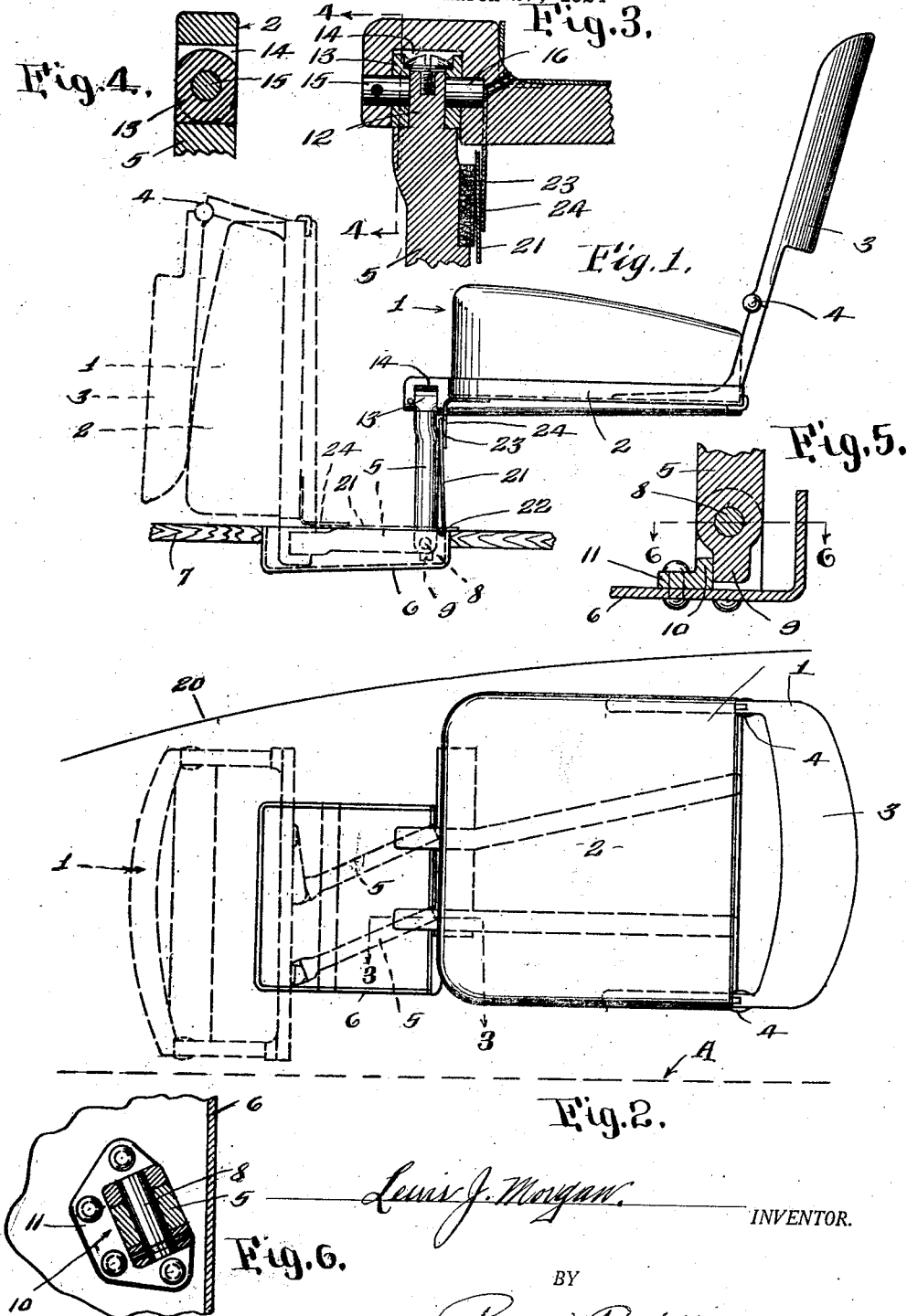

1,578,676

UNITED STATES PATENT OFFICE.

LEWIS J. MORGAN, OF SYRACUSE, NEW YORK.

FOLDING AUTOMOBILE SEAT.

Application filed March 27, 1924. Serial No. 702,383.

*To all whom it may concern:*

Be it known that I, LEWIS J. MORGAN, a citizen of the United States, and a resident of Syracuse, in the county of Onondaga and State of New York, have invented a certain new and useful Folding Automobile Seat, of which the following is a specification.

This invention relates to folding automobile seats of the type set forth in my pending application, Sr. No. 582,904, filed August 19, 1922, and has for its object a particularly simple and efficient modification of the folding seat mechanism shown in said application and particularly a simple and efficient means for hinging the legs or seat support to the base and to the seat, so that the seat moves rectilinearly but inwardly and forwardly into folded position, that is, the seat maintains its parallelism with the central longitudinal vertical plane of the vehicle body when being shifted obliquely inwardly and forwardly to folded position or obliquely outwardly and rearwardly to upright position.

It also has for its object a simple and efficient cover or trim sheet for its chair supporting means or legs when the chair is folded and also when the chair is unfolded into upright position.

The invention consists in the novel features and in the combinations and constructions hereinafter set forth and claimed.

In describing this invention, reference is had to the accompanying drawings in which like characters designate corresponding parts in all the views.

Figure 1 is a side elevation of this folding seat, the contiguous portion of the floor of an automobile being shown and also the position of the seat when in its folded position being indicated in dotted lines.

Figure 2 is a plan view of the parts seen in Fig. 1, the position of the tapering side of the automobile body being shown.

Figure 3 is an enlarged fragmentary sectional view on line 3—3, Fig. 2.

Figure 4 is a sectional view on line 4—4, Fig. 3.

Figure 5 is the enlarged vertical fragmentary sectional view through the lower end of a leg and contiguous parts.

Figure 6 is a sectional view on line 6—6, Fig. 5.

This folding automobile seat or chair comprises generally a seat body, a base, a support, standard leg, or legs for carrying the seat body, the support, standard leg or legs being connected to the body and to the base, it being hinged to the base on an inclined axis or pivot extending at an inclined angle to a transverse plane containing the legs or support, when upright, and arranged at a right angle to the central vertical longitudinal plane to the vehicle body, and such support being connected at its upper end to the seat body by a joint having universal action or swiveling action about a vertical axis and a hinging action about a horizontal axis extending parallel to said central vertical longitudinal plane of the body or at a right angle to said transverse plane.

1 designates the chair generally, which includes a body or seat 2 and a folding back 3, which is hinged at 4 by a stop joint. The support for the chair or seat 2 comprises a pair of legs 5 located, when upright, in a transverse plane arranged at substantially a right angle to the central longitudinal vertical plane of the vehicle body designated A in Fig. 2. 6 is the base which is located in the floor 7 of the vehicle.

The legs 5 are hinged by pins 8 to the base 6, the pins 8 being arranged at an inclined angle to said transverse plane and to the central longitudinal plane A of the vehicle body. The legs are also provided with suitable stops 9 arranged to engage the shoulders 10 provided on plates 11 located in the base 1 in juxtaposition to the lower ends of the legs 5. The legs 5 are connected at their upper ends to the seat 2 by a joint having a swivelling action about a vertical axis and a hinging action about a horizontal axis parallel to the central vertical plane A of the vehicle.

As here shown, each leg 5 is formed with an upright spindle 12 at its upper end and which is journalled in a head or knuckle 13, this head or knuckle 13 being arranged in a suitable recess 14 in the front portion of the seat 2 and having hinge pins or trunnions 15, 16 on the front and rear sides thereof. These trunnions are preferably fixed to the seat 2 and journalled in the head or knuckle 13. These trunnions 15, 16 are radial with the spindle 12 and extending forwardly and rearwardly in planes parallel to the central vertical longitudinal plane A of the vehicle body or at right angle to the transverse plane in which the legs 5 are located.

Owing to the hinging of the legs 5 at their lower ends on the inclined hinge pins 8 and to the swiveling and hinging of the legs 5 at their upper ends to the seat body 2, the seat will fold forwardly and inwardly toward the central longitudinal vertical plane of the vehicle body and, at the same time, the seat will move rectilinearly or the seat body will maintain its parallelism with the central longitudinal plane. Thus, the seat will move forwardly and inwardly rectilinearly and, follow the incline or curve of the side wall 20 of the vehicle body.

21 is a trim or cover sheet for the base 6 when the seat is folded and for the rear sides of the legs 5 when the seat is unfolded or upright, this trim sheet being hinged or flexibly secured at 22 at its lower edge to the base 6 and slidably engaged at 23 to the rear sides of the legs near the seat 2. Thus, the sheet 21 moves from horizontal to upright position and vice versa with and by the legs 5.

Also, a second trim sheet 24 is carried by the seat 2 on the underside thereof and laps the upper margin of the sheet 21. When the seat is folded, as shown in dotted lines, Figs. 1 and 2, these sheets 21 and 24, particularly the sheet 21, forms a cover for the base 6 and when the seat is in its upright position forms a cover or a trim for the rear sides of the legs.

What I claim is:

1. In a folding automobile seat, the combination of a seat body, supporting means for the body arranged when upright in a transverse plane extending at approximately a right angle to the central longitudinal plane of the vehicle body, said means being hinged at its lower end on an axis extending at an inclined angle to such central longitudinal plane of the vehicle body, and being connected at its upper end to the seat body by a combined swiveling and hinge joint, comprising a part hinged to the seat body on an axis extending at an angle to said transverse plane, and a part swivelled in the former part.

2. In a folding automobile seat, a seat body, a pair of legs arranged in a transverse plane, located at substantially a right angle to the central vertical longitudinal plane of the vehicle body, the legs when upright being hinged at their lower ends on axes arranged at an inclined angle to such transverse plane, and each being connected at its upper end to the seat body by a joint having a swivelling action, and a hinging action about a horizontal axis at substantially a right angle to the transverse plane in which the legs are located, each of said joints comprising a part hinged to the seat body on a horizontal axis arranged at an angle to the transverse plane in which the legs are located and parts at the upper end of the legs journalled in the former parts.

3. In a folding automobile seat, a seat body, legs arranged, when upright, in a transverse plane, located at a right angle to the central vertical longitudinal plane of the vehicle body, and being hinged at the lower ends on axes extending at an inclined angle to such transverse plane, a swivel joint at the upper end of each leg, said joint being pivoted to the seat body on a horizontal axis extending substantially parallel to the central longitudinal vertical plane of the vehicle body, and at a right angle to the transverse plane in which said legs are located.

4. In a folding automobile seat, a seat body, legs arranged when upright, in a transverse plane located at a right angle to the central vertical longitudinal plane of the vehicle body, and being hinged at their lower ends on axes extending at an inclined angle to such transverse plane, each leg being provided with an upright spindle at its upper end, and a head mounted on the spindle and hinged to the seat body on a horizontal axis extending forwardly and rearwardly of the seat body, the spindle being journalled in the head.

5. In a folding automobile seat, a seat body, legs arranged when upright, in a transverse plane located at a right angle to the central vertical longitudinal plane of the vehicle body, and being hinged at their lower ends on axes extending at an inclined angle to such transverse plane, the legs being formed with upright spindles at their upper ends, a head swivelled on each spindle, the spindle being journalled in the head and horizontally, forwardly and rearwardly extending hinge pins connecting each head and the seat body.

6. In a folding automobile seat, the combination of a seat body, a base, a pair of legs supporting the seat body, and at their upper ends to the seat body, whereby the seat folds downwardly from upright to folded position, a trim sheet hinged to the base, in the rear of said legs and slidably engaging the legs and a second trim sheet carried by the seat body and lapping the upper margin of the first trim sheet.

7. In a folding automobile seat, the combination of a base, a seat body, legs hinged at their lower ends to the base, and being arranged, when upright, in a plane extending transversely of the automobile body, at a right angle to the central longitudinal vertical plane of the automobile body, and being connected at their upper ends to the seat body by a joint having a universal action, a trim sheet for forming a cover for the base when the seat is folded, said trim sheet being hinged at its lower end to the base, and arranged to cover the rear side of the legs when the seat is unfolded, and a second trim sheet carried by the seat body, and lapping the upper margin of the first trim sheet.

In testimony whereof, I have hereunto signed my name, at Syracuse, in the county of Onondaga, and State of New York, this 7th day of March, 1924.

LEWIS J. MORGAN.